SYNCHRONIZING PULSE GENERATOR

Filed Sept. 27, 1962 2 Sheets-Sheet 1

INVENTOR.
WILBUR E. DUVALL
BY Samuel Lindenberg
ATTORNEY

SYNCHRONIZING PULSE GENERATOR

Filed Sept. 27, 1962 2 Sheets-Sheet 2

WILBUR E. DUVALL
INVENTOR.

BY Samuel Lindenberg

ATTORNEY

United States Patent Office 3,247,491

Patented Apr. 19, 1966

3,247,491

SYNCHRONIZING PULSE GENERATOR

Wilbur E. Du Vall, Gardena, Calif., assignor, by mesne assignments, to The Electrada Corporation, Los Angeles, Calif., a corporation of Delaware Filed Sept. 27, 1962, Ser. No. 226,494
6 Claims. (Cl. 340—172.5)

This invention relates to Data Transmission and Receiving Systems of the type employing pulses and more particularly to improvements in circuits for transmitting and receiving synchronizing pulses in such systems.

In a data transmission system it was desired to generate a pulse signal which was to precede data pulses and when received was to be distinguishable from the data pulses and also from noise signals.

Accordingly, an object of this invention is to generate a synchronizing pulse signal from a timing pulse signal source which is readily identifiable.

Still another object of the present invention is to provide a circuit arrangement for generating a synchronizing pulse signal which has a different pulse time than the data pulse signals which are derived from a source of pulse signals.

Still another object of this present invention is a provision of a novel, useful synchronizing pulse signal generator for data transmission systems.

Yet another object of this invention is the provision of a unique system for receiving signals of the type described and detecting them without error.

Another object of the present invention is the provision of a novel and useful sync detection system.

These and other objects of the present invention may be achieved in an arrangement where a pulse signal source provides pulse signals at a clock frequency. Circuitry is provided whereby a first one of these pulses which is to indicate the commencement of a word of data is given a length which is longer than one data pulse but shorter than two data pulses whereby it may be readily distinguished and detected for the purpose of indicating the commencement of data. In accordance with the description herein, but not to be construed as a limitation on the invention, such sync pulse duration is one and one half times the duration of a data pulse.

At the receiver in response to the leading edge of a received pulse a quiescent oscillator is enabled to commence oscillating. The oscillations of the oscillator are made to occur at a frequency which is twice that of the binary bit rate. The output of the oscillator is applied to a four count counter. The third count of the counter is detected and applied to a gate. If the trailing edge of a synchronizing pulse occurs while that gate is open then the remainder of the receiving system can proceed to receive data pulses. If the clock drives the 4 bit counter to its fourth count before the trailing edge of a sync pulse is detected then the system is reset and waits for the leading edge of the next pulse to see whether or not such next pulse is a truly synchronizing pulse.

The novel features that are considered characteristic of this invention are set forth with particularity in the appended claims. The invention itself, both as to its organization and method of operation, as well as additional objects and advantages thereof, will best be understood from the following description when read in connection with the accompanying drawings.

Figures 1, 2:
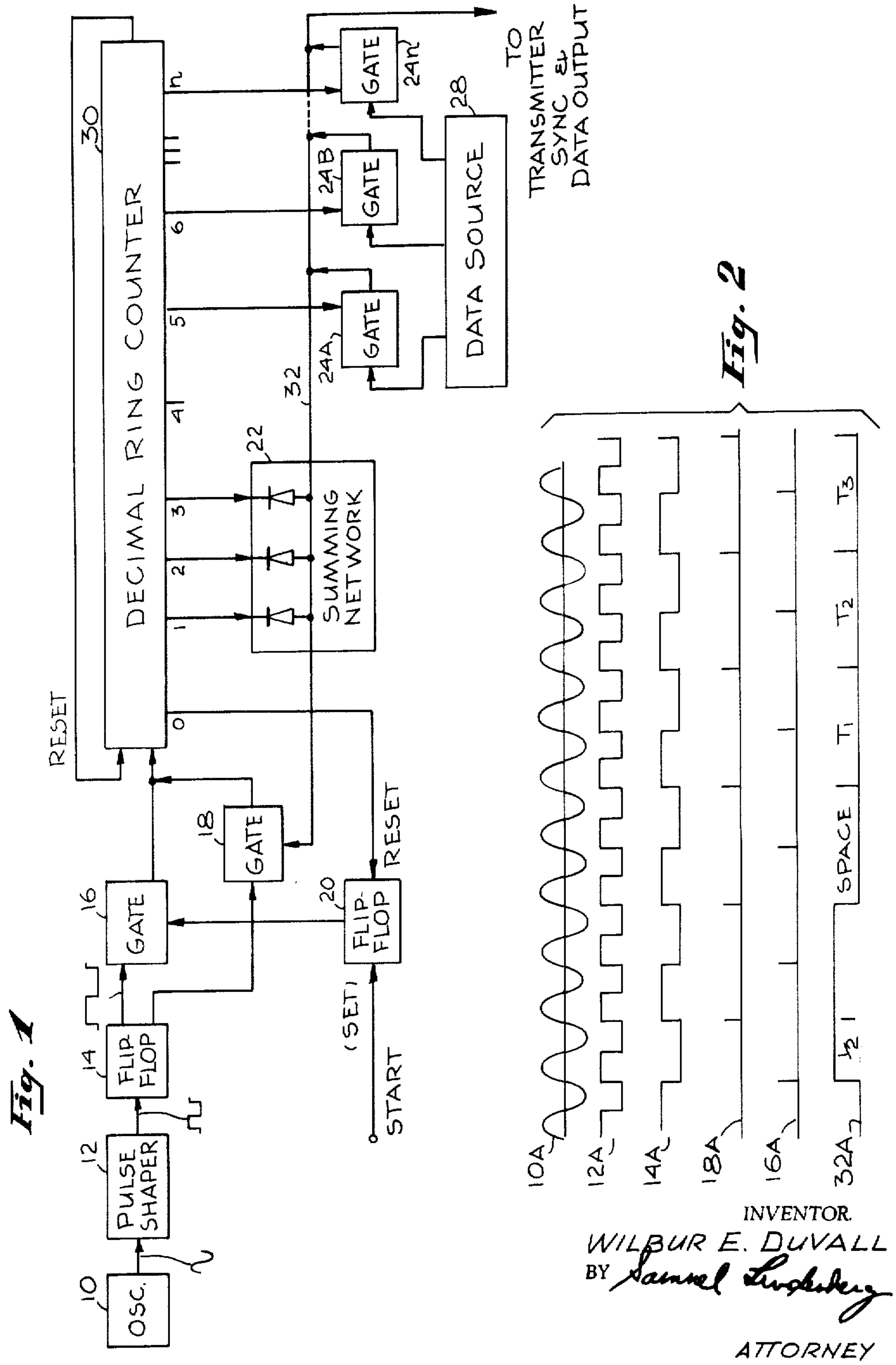
FIGURE 1 is a block diagram of a transmitter in accordance with this invention.
FIGURE 2 is a wave shape diagram shown to assist in the understanding of FIGURE 1.

Reference is now made to FIGURE 1 which is a block diagram of a transmitter in accordance with this invention. An oscillator 10 oscillates at a frequency which is twice that desired for the data bit rate, that is the rate at which binary data pulses will be read out of the data transmitter shown in FIGURE 1. The output of the oscillator 10 is a waveshape 10A, as shown in FIGURE 2 and is applied to a pulse shaper 12. This pulse shaper squares up the output of the oscillator 10. The waveshaper 12A in FIGURE 2 represents the square wave output from the pulse shaper 12.

The pulse shaper output is applied to a flip-flop 14 driving it from one to the other of its stable states successively which, as is well known, will provide two outputs each one of which is at a frequency which is one half that of its input. The wave shapes 14A represent the output of the flip-flop 14. The flip-flop outputs are applied to two coincidence gates respectively 16 and 18. Accordingly, gate 16 is enabled so its output, represented by 16A, will be at half the frequency of the flip-flop 14 input. Likewise, when gate 18 is enabled its output, represented by wave shape 18A, will be at half the frequency of the input to 14.

Gates 16 and 18 are both coincidence gates and thus require the simultaneous presence of both of their inputs before they can provide an output. The second required input to gate 16 is the set output of a flip-flop 20. This flip-flop is driven to its set state whenever it is desired to initiate the operation of the data transmitter. The second required input to the gate 18 is the output of a summing network 22.

The purpose of the transmitter shown in FIGURE 1 is to read out onto a transmission line information which is available in parallel form. It is desired to transmit this information to a transmission line, or over the air in serial form. In order to accomplish this there is shown a plurality of gates respectively 24A, 24B, . . . *n*. These gates are also "and gates" or "coincidence" gates. Data signals are applied in parallel to each one of these gates, from a data source 28. In order to read the data out of these gates 24, 26, . . . *n*, the output of a decimal counter designated by the reference numeral 30, is employed. The outputs of the decimal counter commencing with its 5th count and the following counts thereafter are employed to gate out the data from the gates 24, 26, . . . *n*. The first 4 counts of the decimal counter are employed for the purpose of generating the sync pulse and a spacing interval thereafter.

The operation of the system will now be described. It is desired to commence the transmission of data which has been stored in the data source 28 in parallel form. A signal is applied to flip-flop 20 in order to drive it to its set state. When this occurs gate 16 is opened whereby it is enabled to supply differentiated pulses 16A to the decimal counter 30. The decimal counter is driven to provide its first count output by the first pulse. This applies a pulse to the summing network which enables the gate 18 to open. It will be noted that every output of the gates 24, 26, . . . *n*, as well as an output from the summing network, is connected to a common bus 32.

The summing network, applies the counter output to the collector bus 32. This is the first portion of the synchronizing pulse 32A, as shown in FIGURE 2. The gate 18 is now open. Accordingly, the other output of the flip-flop 14, which is interlaced with the output which is applied to gate 16, can now pass through gate 18 and be applied to the input of the counter 30. Accordingly, a second pulse is applied to the summing network 22 from counter 30. Thereby, the summing network can add the second count output of the counter to the first count pulse on the bus 32. This is shown by the wave shape 32A. Still a third count output of the counter is applied to the summing network 22 to form the last portion of the sync pulse. Upon the occurrence of the fourth count output of the counter, gate 18 is closed and the counter is advanced only in response to an output from gate 16.

Since, for the first four counts the counter is being driven at the frequency of the oscillator 10, which is twice the frequency of the output from either gate 16 or gate 18, output from the counter occurs at the frequency of the oscillator 10. At the fourth count gate 18 is closed, and the counter 30 is driven at half the rate at which it was driven in response to the combined outputs of gates 16 and 18.

As shown by the wave shape 32A, a sync pulse is established on the collector bus 32 which has a duration of one and a half times the binary bit time at which the binary bits will now be read out of the respective gates 24A, 24B . . . **24*n*, in response to the count pulses from the remaining counter stages of the ring counter 30. In addition the sync pulse is followed by a space interval having a one bit duration time. Therefore, the sync pulse is readily distinguishable from the bit rate and can signify the commencement of a binary word. The output of the last stage of the ring counter is used to reset the counter. The initial state of the counter is applied to the flip-flop 20 to drive it back to its reset state. This closes gate 16. As a result the apparatus is now in condition for a new read-out of data from the data source 28**.

Figures 3, 4:
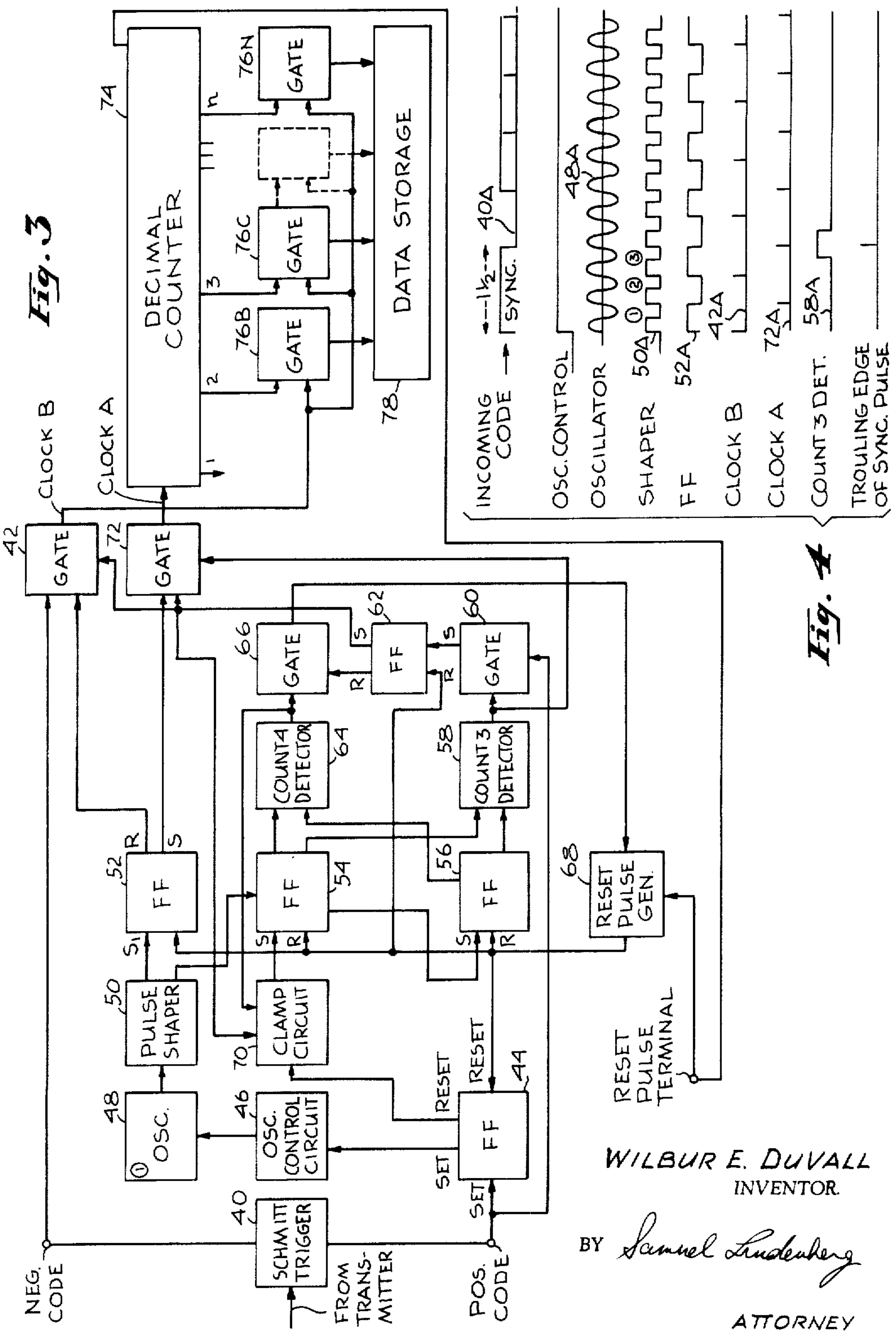
FIGURE 3 is a block diagram of a receiver in accordance with this invention.
FIGURE 4 is a wave shape diagram shown to assist in an understanding of FIGURE 3.

The collector bus is connected to any suitable transmission system, not shown, which will deliver the pulse train established on the collector bus to a receiver, which is shown in FIGURE 3.

The apparatus described generates a leading or sync pulse for data which is readily distinguishable from the data and thus can be employed by a receiver for the purpose of indicating the commencement of a data interval. It should be noted that despite any variation of the oscillator from which the bit rate is derived the initial sync will vary accordingly and thus always be distinguishable from other bits. Accordingly, the stability requirement for the oscillator is reduced considerably in accordance with this invention.

Another feature of this invention is, that if it is desired to vary the bit rate, all that is required is that oscillator frequency be altered. Nothing else is required since the sync pulse which is derived by means of the circuitry which has been described, will automatically be altered accordingly.

Referring now to FIGURE 3, there is shown a block diagram of a receiver in accordance with this invention. FIGURE 4 represents waveshapes represented as the outputs of circuits shown in FIGURE 3. The received code is applied to a Schmitt trigger circuit 40. In response to the received signals the Schmitt trigger circuit generates both positive and negative replica of the received signals. The negative replica of the received code is applied to a coincidence gate 42 which requires a second input before it will open. The positive representation of the code is applied to a flip-flop 44. In response thereto the flip-flop 44 is driven to its set state. The set output of flip-flop 44 is applied to an oscillator control circuit 46. This circuit can then remove blocking bias from an oscillator 48 which can then commence to produce oscillations as shown by waveshape 48A. The oscillator starts oscillating immediately and effectively in response to the leading edge of the synchronizing pulse which set the flip-flop 44.

Referring now to FIGURE 4 it will be seen that the sync pulse portion of the incoming pulse train 40A has an interval on the order of one and one-half times the binary data bit interval which follows the sync pulse on the input line. As soon as the sync pulse is received the oscillator 48 starts oscillating. The pulse shaper 50 squares the output of the oscillator. The pulse shaper output is represented by the wave shape 50A.

The frequency of the oscillator 48 is the same as the oscillator 10 at the transmitter. Therefore its frequency is exactly twice the binary bit rate and therefore three oscillations of the oscillator are equivalent to the time duration of the sync pulse. The output of the pulse shaper 50 is applied to both a flip-flop 52 and to a four count binary counter composed of two flip-flop stages respectively 54, 56. Flip-flops 54 and 56 in response to the pulse shaper output, proceed to count. When they attain a third count state, a count detector 58, which receives the outputs of these two flip-flops when these outputs represent the binary 3 count, is enable to apply an output to the input of the gate 60. This gate is a coincidence gate. Its other input is also received from the same input that drives the flip-flop 44. This other input will be, at this time, if all is in order, the trailing edge portion of the sync pulse shown in the wave shape 40A.

A flip-flop 62 is driven to its set state by the output of gate 60. The flip-flop set output is applied to gate 42 and also to a gate 72. The flip-flop set output is also applied to a clamp circuit 70 which operates to prevent the binary counter consisting of the flip-flops 54 and 56 from advancing to the fourth count. The gate 72 is a three input gate. Besides the output of the flip-flop 62 it also receives the output of the count three detector 58 and also the output of the flip-flop 52. Flip-flop 52 is driven by the oscillator 48 and its output is represented by waveshape 52A. The output of the flip-flop 52 is one-half the oscillator frequency and therefore the output of the gate 72 consists of a sequence of pulses which have one-half the frequency of the oscillator 48. Gate 72 proceeds to drive a decimal counter 74. Each count output of the counter starting with the second count is applied to a different gate. These gates respectively 76B through **76*n*, receive the output of the associated count states of the counter and also each of these gates receives, from a common bus, the incoming binary code bits through the now open gate 42**.

At this time it should be noted that the gate 42 receives as one of its inputs the negative code signal and as its second input the set output of the flip-flop 52. The flip-flop 52 is driven between its set and reset states by the pulse shaper output and consequently the output applied to gate 42 comprises pulses which have one-half the frequency of the oscillator 48. Accordingly, the output of the gate 42 will only consist of binary bits which represent a one since any received binary bits representing a zero do not enable the gate to pass on output. The one binary bits are thus properly clocked by the oscillator. Therefore the counter 74 enables the respective gates to provide one binary bit outputs at intervals clocked by the output of gate 72. It should be noted however, that since both outputs of flip-flop 52 are employed to drive the respective gates 42 and 72 these gates are alternately enabled and thus the code pulses which constitute the outputs of the gates respectively 76B through **76*n*, occur during the interlace intervals. The alternate pulse outputs of this on the gates 42 and 72 are represented by wave shapes 42A and 72A. The outputs from the gates are entered into a data storage circuit 78**.

When the ring counter has terminated its count it applies a signal to a reset pulse generator 68 the output of which is applied to reset all of the flip-flops 44, 52, 54, 56, 62. Flip-flop 44 actuates the oscillator control circuit 70 which terminates further operation of the oscillator 48.

The system is now in condition to receive a new data transmission.

If the trailing edge of a sync pulse is not received during the interval of the third count of the binary counter consisting of flip-flops 54 and 56, then the binary counter is driven to its fourth count state. This is detected by a four count detector 64, consisting merely of a pair of diodes connected to those outputs of the binary counter producing an output when the counter represents its four count. The output of the count for detector 64 is applied to the gate 66. This gate 66 can then produce an output in response to which the reset generator 68 is driven to provide a reset pulse. The output of the reset pulse generator resets flip-flop 52 whereby gate 42 is closed. The reset generator output is also applied to reset flip-flops 54 and 56 to their initial count state. In addition, the reset generator resets the flip-flop 44 whereby the oscillator is turned off. In addition, the clamp circuit 70 is energized. The clamp circuit 70 applies an output to prevent the counter comprising flip-flops 54 and 56 from advancing any further in response to any more pulses out of the pulse shaper 50.

There has been accordingly described and shown herein a novel and useful circuit arrangement for generating a sync pulse in advance of data which can be detected at a receiver despite the presence of noise and other data pulses.

I claim:

1. In a system for generating data at a transmitter and for transmitting said data to a receiver in the form of a serial pulse train, said data pulses occurring at a clock rate determined by the frequency of oscillation of an oscillator, means at said transmitter for generating a synchronizing pulse preceding a pulse train of data by a predetermined interval, said synchronizing pulse having a duration which is less than the duration of an integral number of data pulses and having a leading and trailing edge, means at said receiver responsive to the leading edge of said synchronizing pulse for generating oscillations at said clock rate, means for counting said oscillations, first means for detecting when said means for counting oscillations has measured an elapsed interval equivalent to the duration of said synchronizing pulse to provide a first indicating signal, means responsive to said first indicating signal to prevent said means for counting said oscillations from further counting, second means for detecting when said means for counting oscillations has measured an elapsed interval longer than the duration of said synchronizing pulse to provide a second indicating signal means for processing said data pulse train responsive to said oscillations, gate means responsive to said first indicating signal and the trailing edge of said data pulse to apply said data pulse train to said means for processing, means responsive to said second indicating signal to terminate further output by said means for generating oscillations and to prevent operation of said means for processing data pulse trains.

2. In a system as recited in claim 1, wherein said synchronizing pulse generated at said transmitter has a duration substantially equal to the duration of three oscillations, said first means for detecting comprises means for detecting when said means for counting said oscillations has counted three of said oscillations, said second means for detecting comprises means for detecting when said means for counting said oscillations has counted more than three of said oscillations.

3. In a system as recited in claim 1, wherein said means at said transmitter for generating a synchronizing pulse preceding a pulse train of data comprises a first and gate, a second and gate, means for applying oscillations from said oscillator alternately to said first and second and gates, a counter, means for connecting the output from said first and second and gates to the input of said counter to advance it through its successive count states, means for enabling said first and gate to apply its output to said counter, means for combining a predetermined number of the earliest count state outputs of said counter to form a synchronizing pulse, means for applying said synchronizing pulse to said second and gate to enable it to apply output to said counter responsive thereto whereby said counter is driven through said predetermined count states responsive to said first and second and gate outputs and is driven thereafter in response to said first and gate output, means for collecting data pulses responsive to count outputs of said counter following said predetermined number of count states, and means for applying said synchronizing pulse to said means for collecting.

4. In a data transmission system wherein data signals are transmitted to a receiver in the form of a serial pulse train consisting of a synchronizing pulse followed by data pulses, said data pulses occurring at a clock rate frequency derived from an oscillator, said synchronizing pulse having the duration of at least one and one half data pulses, a receiver for said data signals including means at said receiver responsive to the leading edge of said synchronizing pulse for generating oscillations at said clock rate, means for counting said oscillations, first means for detecting when said means for counting oscillations has measured an elapsed interval equivalent to the duration of said synchronizing pulse to provide a first indicating signal, means responsive to said first indicating signal to prevent said means from counting said oscillations from further counting, second means for detecting when said means for counting oscillations has measured an elapsed interval longer than the duration of said synchronizing pulse to provide a second indicating signal means for measuring said data pulse train responsive to said oscillations, gate means responsive to said first indicating signal and the trailing edge of said data pulse to apply said data pulse train to said means for processing, means responsive to said second indicating signal to terminate further output by said means for generating oscillations and to prevent operation of said means for processing data pulse trains.

5. In a system for transmitting data in the form of a serial pulse train, said data pulses occurring at a clock rate derived from the output of an oscillator, the improvement comprising means for generating a synchronizing pulse preceding said pulse train comprising a first and gate, a second and gate, means for applying oscillations from said oscillator alternately to said first and second and gates, a counter, means for connecting the output from said first and second and gates to the input of said counter to advance it through its successive count states, means for enabling said first and gate to apply its output to said counter, means for combining a predetermined number of the earliest count state outputs of said counter to form a synchronizing pulse, means for applying said synchronizing pulse to said second and gate to enable it to apply output to said counter responsive thereto whereby said counter is driven through said predetermined count states responsive to said first and second and gate outputs and is driven thereafter in response to said first and gate output, means for collecting data pulses responsive to count outputs of said counter following said predetermined number of count states, and means for applying said synchronizing pulse to said means for collecting.

6. In a system for transmitting data in the form of a serial pulse train said data pulses occurring at a clock rate derived from the frequency of oscillation of an oscillator, the improvement comprising means for generating a synchronizing pulse from the output of said oscillator preceding a pulse train of data, said means including a flip-flop circuit having two stable states, means for applying output from said oscillator to said flip-flop circuit to drive it from one to the other of its two stable states, a first and gate, a second and gate, means for applying output of said flip-flop when in one stable state to said first and gate, means for applying output from said flip-flop when in its second stable state to said second and gate, means for applying a start signal to said first and gate to enable it to pass pulses received from said flip-flop, a counter, having a plurality of different count states, means to apply output from said first and gate to said counter to advance said counter through succeeding count states, means for combining output from said counter as it passes through a predetermined number of its earliest count states to form a synchronizing pulse, means for applying said synchronizing pulse to said second and gate to enable it to pass pulses from said flip-flop, means for applying output from said second and gate to said counter whereby said counter is driven through said predetermined number of count states in response to output from said first and second and gates and through its remaining count states in response to output from said first and gate, means for collecting data pulses responsive to the counts of said counter following said predetermined number of count states, and means for applying said synchronizing pulse to said means for collecting data.

No references cited.

ROBERT C. BAILEY, *Primary Examiner.*